United States Patent Office 2,862,755
Patented Dec. 2, 1958

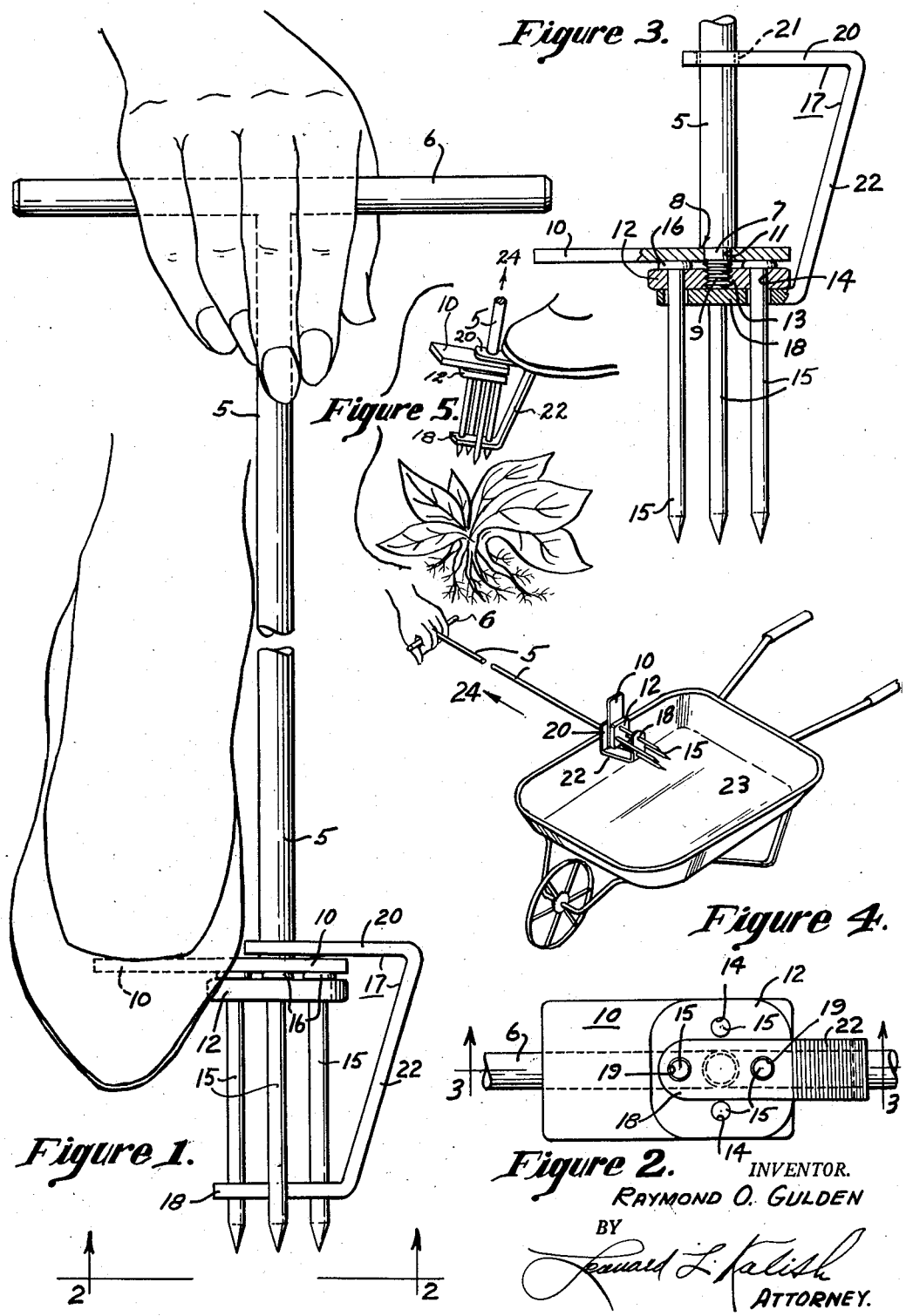

2,862,755
WEED EXTRACTOR
Raymond O. Gulden, Jenkintown, Pa.
Application September 26, 1956, Serial No. 612,147
8 Claims. (Cl. 294—61)

The present invention relates to weed extractors and has for its object the ready extraction of clumps of weeds, from lawns, and the ready ejection of the weed-clump from the extractor by hooking a portion of the stripper-member thereof on the edge of a container such as a wheelbarrow or the like and pulling on the stem of the device.

Another object of the present invention is to facilitate the extraction of the clump of weeds and to reduce the labor involved therein.

A further object of the present invention is to provide a durable construction at minimum cost and one whose operative portions may be replaced, if worn or bent.

In the accompanying drawings in which like reference characters indicate like parts, Figure 1 represents an elevational view of one embodiment of the weed-extracting device of the present invention.

Figure 2 represents an end-elevational view of the same on line 2—2 of Figure 1.

Figure 3 represents a section on line 3—3 of Figure 2.

Figures 4 and 5 represent perspective views of the weed extractor shown in two positions in which the clump of weeds is to be dislodged from the prongs.

The weed extractor of the present invention includes a stem 5, which may be a round rod of cold-rolled steel or wrought iron or the like of approximately 1/4" to 3/8" in diameter, more or less, and of a length such that when its lower end is at ground level and the rod is held generally vertically, the upper end thereof will be about waist-high to the average person.

To the upper end of the stem 5 any suitable handle 6 may be secured, as, for instance, by welding.

The lower end of the stem 5 is reduced in diameter, as at 7, to provide a slight shoulder 8, and the outer end 9 of this reduced-diameter portion is threaded.

A foot-treadle plate 10, having a hole 11 thereof of a diameter snugly to fit the reduced-diameter portion 7, is telescoped over such reduced-diameter portion, as indicated in Figure 3, with the portion thereof surrounding the hole 11 bearing against the shoulder 8.

The hole 11 is so placed as to leave the major portion of the plate 10 to one side or to project laterally, as indicated in the drawings.

A pin-plate or prong-plate 12, having a central threaded aperture 13 and four prong or pin receiving apertures 14, is provided for threading onto the threaded end 9 of the stem 5, and to receive prongs 15.

A nail-like pin or prong 15, preferably a hardened steel nail of the type used for masonry, and having a head 16, is extended through each of the prong-receiving holes 14 in the prong-plate 12.

The generally C shaped stripper-member 17 is formed of a band of metal such as steel, cold-rolled steel or wrought iron or the like. The C shaped stripper-member 17 has a lower stripped-plate or portion 18 with holes 19 therein, for telescoping freely over two of the prongs 15 (as indicated particularly in Figures 2 and 3) and has an upper and laterally extending hooking portion 20 with a hole 21 therein for telescoping over the stem 5 (as indicated in Figure 3) and an intervening connector portion 22 rigidly connecting the lower stripper-plate 18 and the upper hooking portion 20.

In assembling the weed extractor, the nails, pins or prongs 15 are first extended through the holes 14, and the stripper-plate 18 is telescoped or slid over two of the prongs 15. Thereafter the upper hooking portion 20 is telescoped over or slid onto the stem 5. Then the foot-treadle plate or member 10 is placed over the reduced-diameter portion 7 of the stem 5. Thereafter the prong-plate 12 is threaded onto the threaded end 9 of the stem 5 until the heads 16 of the prongs 15 tightly abut against the foot-treadle plate 10, while the latter bears tightly against the shoulder 8. The weed extractor is thus assembled and ready for use.

If desired, the outer threaded end 9 of the stem 5 may be riveted over slightly to prevent the unthreading of the prong plate 12 from said threaded end 9, or it may be welded over slightly, for the same purpose.

As so assembled, the C shaped member 17 may slide up and down on the stem 5 and prongs 15, from the position shown in Figure 1 to the position shown in Figure 3, and back again, being free so to slide thereon. The distance between the stripper-plate 18 and the hooking member 20 is such that when the C shaped member 17 is in its down position as shown in Figure 1, the stripper-plate 18 will be close to the ends of the prongs 15 but will still be on the prongs 15.

To extract a weed, the four prongs 15 are placed so that they straddle what is estimated to be the center of the weed or the center of the root-formation or root-cluster of the weed, while the stem 5 is held vertically, so that the center of the root-cluster of the weed will be approximately in line with the axis of the stem 5.

Then, while lightly holding the handle 6 in one hand, merely to maintain the stem 5 of the weed extractor in a generally vertical position (and without relying on the hand which holds the handle 6 to exert any significant downward force on the weed extractor), one foot is placed on the laterally extending portion of the foot-treadle 10 as indicated in Figure 1, and the prongs 15 are thereby pushed into the ground, around the root of the weed, merely by the force applied by the foot to the treadle 10.

As the prongs 15 are so pushed into the ground, the stripper-plate 18 is automatically pushed up (on the pins 15) to a position shown in Figure 3, and the lower surface of the stripper-plate 18 comes in contact with the weed or the earth adjacent to it or surrounding it.

When the prongs have been completely driven in, the handle 6 is given a slight turn, so as to turn the device a quarter or a third or a half a turn (more or less) about its vertical axis. This turning causes the clump of roots to be separated from the surrounding earth and causes the small root-extensions to be wrapped around the prongs 15. The weed extractor is then just lifted up by handle 6 and the clump of earth, with the roots, will be held between the prongs 15, and the weeds will be along with it, flaring outwardly.

Thereafter the device is applied to any suitable container, such as the wheelbarrow 23, in the manner indicated in Figure 4, namely, by hooking the upper surface of the hooking portion 20 of the C shaped member 17 on the edge of the container or wheelbarrow 23 and pulling on the stem 5 in the direction of the arrow 24. This causes the C shaped member to move towards the lower or free ends of the prongs 15 and thus cause the clump roots and earth (and the weeds connected therewith) to be pushed from between the prongs 15, from where they drop into the container or wheelbarrow 23.

The weed extractor is then ready for another similar application to another clump of weeds, in the manner above described.

By mounting the prongs 15 in the manner above described (and shown in the drawings) the prongs 15 can be replaced from time to time, if necessary.

However, I may also weld or otherwise secure the prongs directly to the treadle-plate 10, without any intervening prong-plate 12, and I may also weld or otherwise secure the treadle-plate 10 to the stem 5.

Instead of dislodging the weed in the manner shown in Figure 4, the weed may also be dislodged by merely hooking the portion 20 against the sole of the shoe of the user, while holding the lower end of the device over any container, and pulling up on the handle 6 (or pushing the C member down with the foot), as indicated in Figure 5.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, it is claimed:

1. A weed extractor including a stem having a handle portion at its upper end, a plurality of spaced-apart prongs extending from its lower end, a stripper extending into the zone between said prongs and slidably guided thereby, an upper guide portion having a hole therein through which said stem extends for guiding it, and a connecting portion extending laterally to one side of said prongs and stem, rigidly connecting said stripper with said upper guide portion.

2. A weed extractor including a stem having a handle portion at its upper end, a plurality of spaced-apart prongs extending from its lower end, a stripper extending into the zone between said prongs and slidably guided thereby, an upper guide portion having a hole therein through which said stem extends for guiding it, and a connecting portion extending laterally to one side of said prongs and stem, rigidly connecting said stripper with said upper guide portion, said connecting portion having a laterally extending shoulder facing upwardly for engagement with the edge of a container or with the foot of the operator, against which (container or foot) the stem may be pulled for causing the stripper to eject a weed clump from between said prongs.

3. A weed extractor including an elongated stem, a laterally extending foot-treadle at the lower end thereof, a plurality of spaced-apart weed-extractor prongs extending forwardly from said foot-treadle and having a weed-receiving space therebetween, a generally C shaped member having its lower portion guided by said prongs and constituting a stripper member therebetween and having its upper portion guided on said stem exteriorly thereof, said upper portion thereof forming a hook for engagement with the edge of a container or the foot of the operator or user for causing the stripper member to dislodge the weeds from between said prongs when such hook is hooked on the edge of a container and the stem is pulled in a direction away from the C shaped member.

4. A weed extractor including a stem having a reduced-diameter, a lower terminal portion, the end of which is threaded, a treadle-plate having a hole telescoping over said reduced-diameter-portion and bearing against the shoulder between such reduced-diameter-portion and the larger diameter portion of said stem, a prong-plate having prong-receiving apertures and a threaded aperture therebetween, headed prongs in said prong-receiving apertures, said prong-plate being threaded onto the said threaded end of said stem, with the heads of said prongs bearing against said treadle-plate, and a generally C shaped stripper member having its lower portion between said prongs and guided thereby and having its upper portion apertured and guided on said stem exteriorly thereof, with said upper apertured portion having a laterally extending hooking portion which will cause the removal of the weeds from between said prongs when hooked on any relatively stationary object and said stem is pulled.

5. A weed extractor including a stem having a reduced-diameter, a lower terminal portion, the end of which is threaded, a treadle-plate having a hole telescoping over said reduced-diameter-portion and bearing against the shoulder between said reduced-diameter-portion and the larger diameter portion of said stem, a prong-plate having prong-receiving apertures and a threaded aperture therebetween, headed prongs in said prong-receiving apertures, said prong-plate being threaded onto the said threaded end of said stem, with the heads of said prongs bearing against said treadle-plate, and a generally C shaped stripper member having its lower portion between said prongs and guided thereby and having its upper portion apertured and guided on said stem exteriorly thereof, with said upper apertured portion having a laterally extending hooking portion which will cause the removal of the weeds from between said prongs when hooked on any relatively stationary object and said stem is pulled, said treadle-plate and said hooking portion extending laterally from said stem in opposite directions.

6. A weed extractor including a stem having a handle portion at its upper end and a plurality of prongs extending from its lower end and spaced from each other to form a weed-receiving space therebetween, a stripper plate between said prongs and guided thereby, a hooking member surrounding said stem and extending laterally therefrom and guided thereby exteriorly thereof, a connecting portion to one side of said prongs and stem and connecting said stripper plate with the hooking member, and a foot-treadle extending laterally from said stem at the lower end thereof, above said prongs.

7. A weed extractor including a stem having a handle portion at its upper end and a plurality of prongs extending from its lower end and spaced from each other to form a weed-receiving space therebetween, a stripper plate between said prongs and guided thereby, a hooking member surrounding said stem and extending laterally therefrom and guided thereby exteriorly thereof, a connecting portion to one side of said prongs and stem and connecting said stripper plate with the hooking member, and a foot-treadle extending laterally from said stem at the lower end thereof, above said prongs, said hooking member and said foot-treadle extending laterally from said stem in opposite directions.

8. A weed extractor including a stem, a laterally projecting foot-treadle at the lower end of said stem, a plurality of spaced-apart prongs beneath said foot-treadle and extending forwardly therefrom, said foot-treadle and said prongs being connected with each other so that by applying foot-pressure on top of said treadle, said prongs can be pushed into the ground by foot-pressure alone, a handle at the upper end of said stem, a stripper extending between said prongs and mounted for slidable up-and-down movement between the upper and lower ends of said prongs, and a laterally projecting hooking member at the lower end of said stem associated with said stripper and movable therewith for hooking engagement with any relatively stationary object, whereby a pull on said stem while said hooking member is in hooked engagement with a relatively stationary object will dislodge the weeds held between said prongs.

References Cited in the file of this patent

UNITED STATES PATENTS

| 1,246,487 | Summers et al. | Nov. 13, 1907 |
| 1,993,314 | Belford | Mar. 5, 1935 |
| 2,500,647 | Schulthess | Mar. 14, 1950 |
| 2,695,188 | Klausman et al. | Nov. 23, 1954 |

FOREIGN PATENTS

| 2,316 | Great Britain | May 26, 1881 |